F. RICHARD.
HEADLIGHT.
APPLICATION FILED APR. 12, 1917.
1,328,692.
Patented Jan. 20, 1920.
4 SHEETS—SHEET 1.
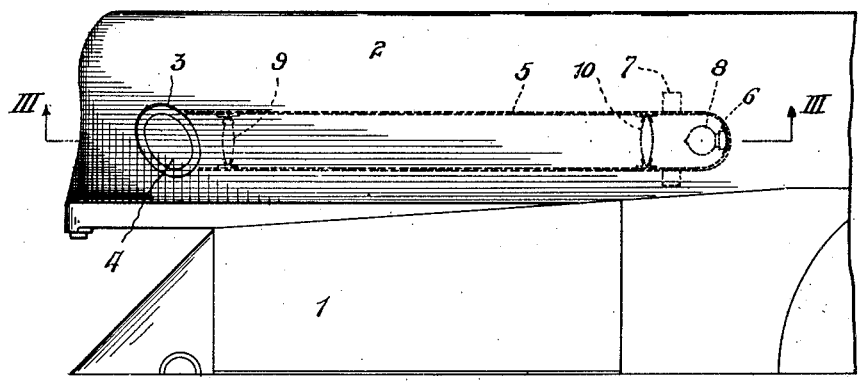
Fig. II.
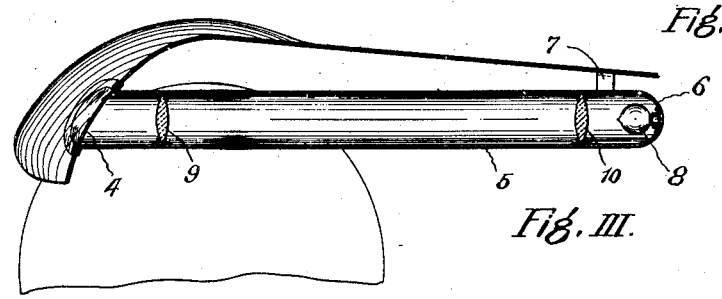
Fig. III.
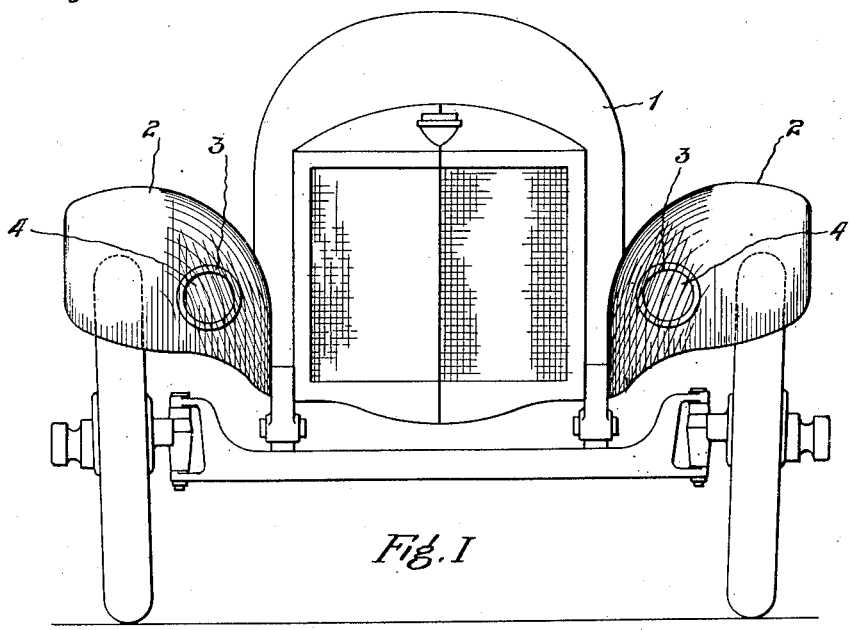
Fig. I.
Inventor
François Richard
by his atty.

F. RICHARD.
HEADLIGHT.
APPLICATION FILED APR. 12, 1917.
1,328,692.
Patented Jan. 20, 1920.
4 SHEETS—SHEET 2.
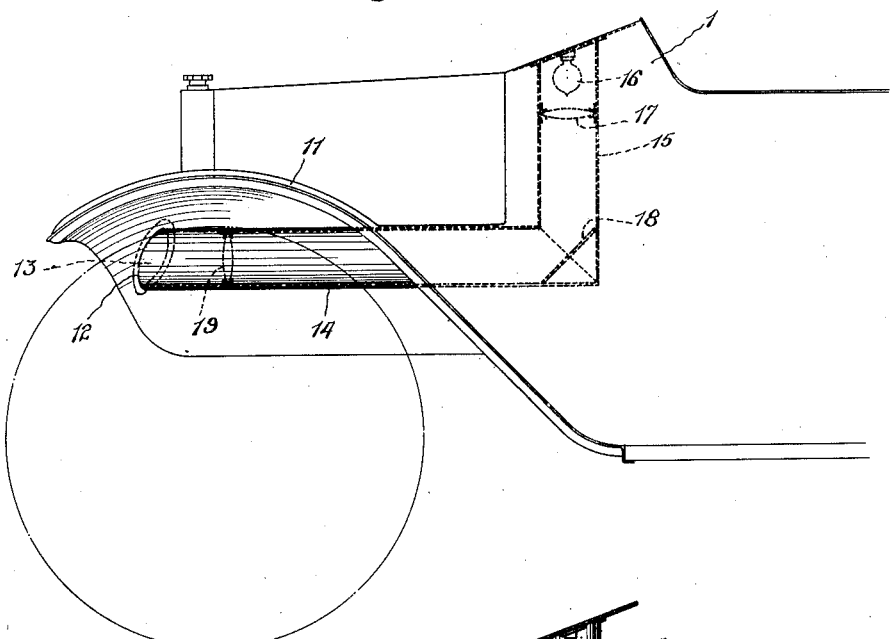
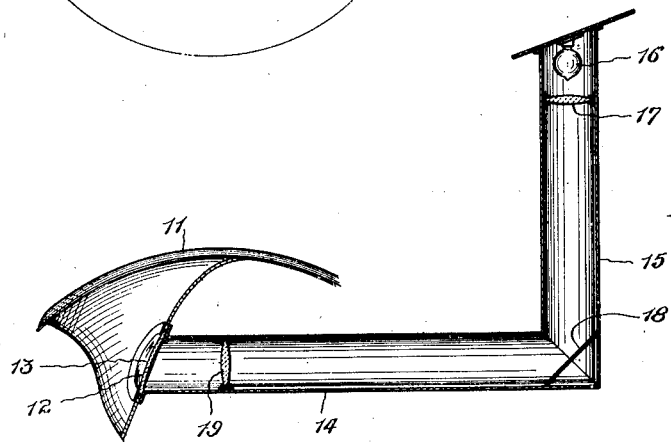
Inventor
François Richard
by his atty.

F. RICHARD.
HEADLIGHT.
APPLICATION FILED APR. 12, 1917.
1,328,692.
Patented Jan. 20, 1920.
4 SHEETS—SHEET 3.
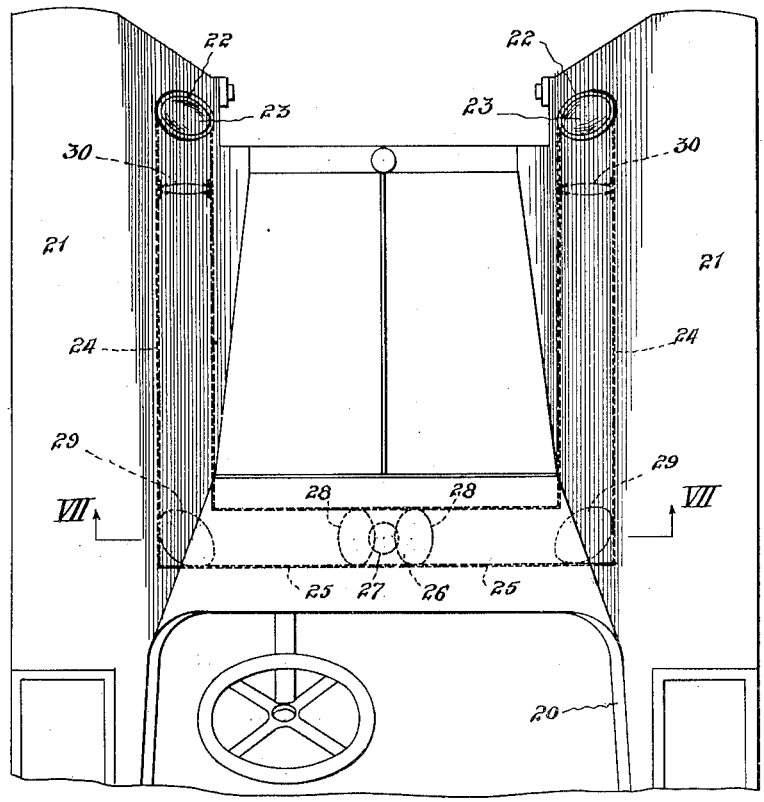
Fig. VI.
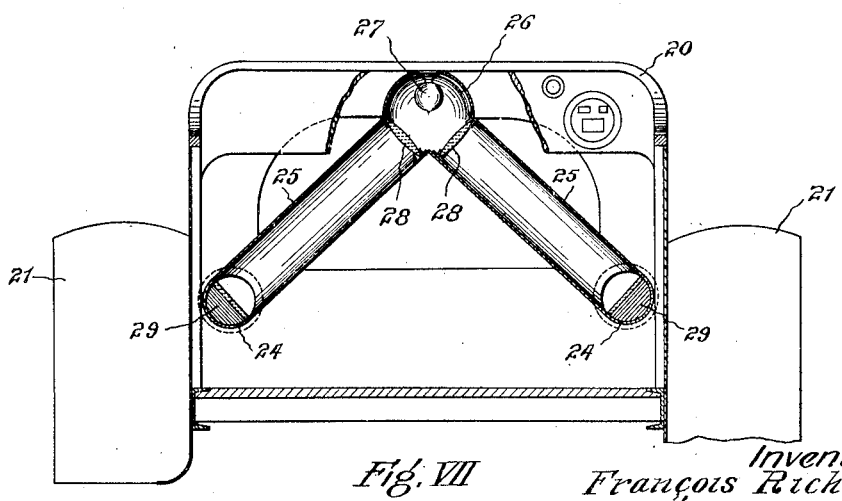
Fig. VII.
Inventor
François Richard
by his atty.

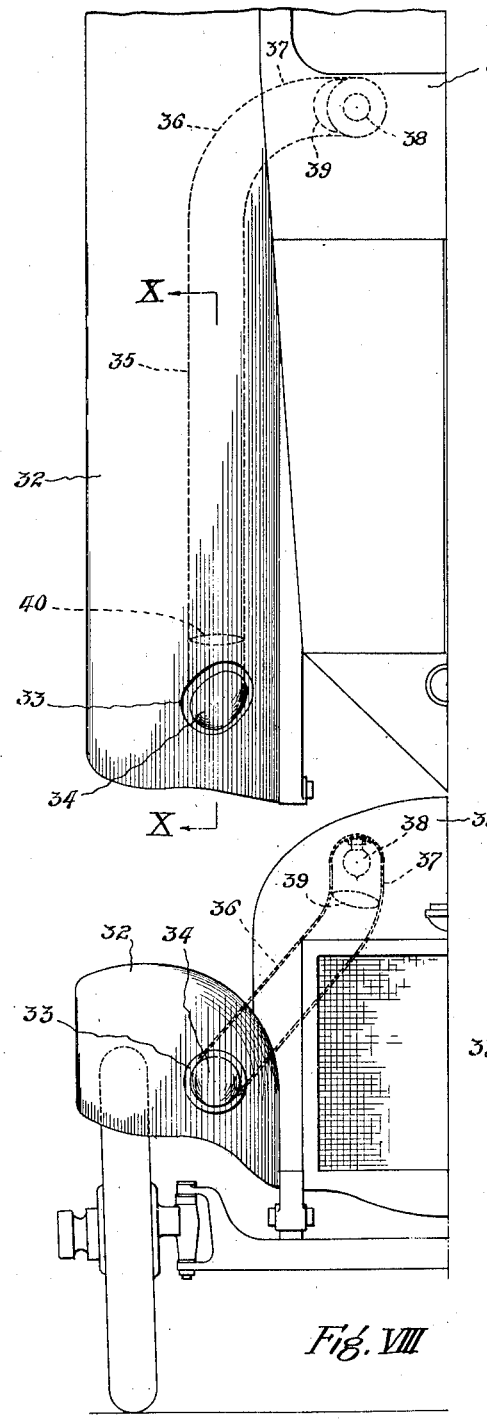
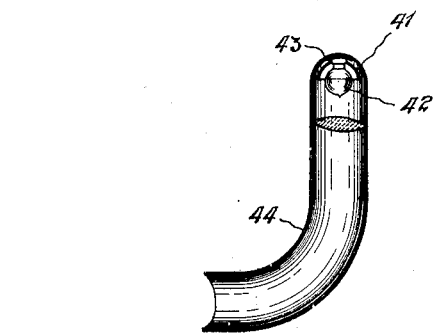
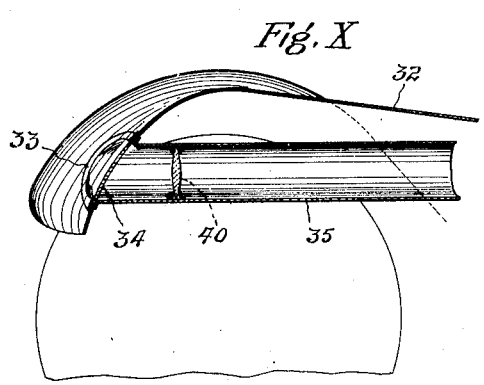

UNITED STATES PATENT OFFICE.

FRANÇOIS RICHARD, OF CLEVELAND, OHIO, ASSIGNOR TO THE RICHARD AUTO MFG. COMPANY, OF CLEVELAND, OHIO.

HEADLIGHT.

1,328,692.  Specification of Letters Patent.  Patented Jan. 20, 1920.

Application filed April 12, 1917. Serial No. 161,531.

*To all whom it may concern:*

Be it known that I, FRANÇOIS RICHARD, a citizen of the Republic of France, residing at Cleveland, in the county of Cuyahoga and State of Ohio, have invented a new and useful Improvement in Headlights, of which the following is a specification, the principle of the invention being herein explained and the best mode in which I have contemplated applying that principle, so as to distinguish it from other inventions.

My invention relates to a head-light and more particularly to an illumination device adapted for use upon an automobile.

So far as my familiarity with the art extends, the main head-lights of an automobile which have generally been located between the front wheels near the radiator have always consisted of lamp structures which were separately supported. Such lamps, besides being unduly expensive and subjected to the risk of injury could never be sightly with consideration of the smooth continuity of automobile body design which has of late come into vogue. Their incongruity in appearance has, of course, been the more noticeable in the day time, when their function was not being exercised and when the automobile upon which they were carried was, of course, more often and more clearly brought to view because then more frequently used.

Accordingly, the object of my present invention is to provide a pair of head-lights for an automobile which will be as inconspicuous as it is possible to have them but which will nevertheless direct rays of light of sufficient intensity to adequately illuminate the roadway ahead. My idea comprehends the concealment of all of the lighting agencies under or behind the fenders and body of the car leaving only the front lens exposed to view, and more than that to so design such glass and its support that it will conform to the contour of the particular front fenders with which the car is supplied.

I would have it expressly understood that I in no wise limit myself to this specific application or embodiment of my invention, which I have selected as a basis for illustrating and describing my invention merely for the purpose of rendering a clear and comprehensive understanding of the scope and novel features thereof.

Adverting to the drawings.

Figure I is a front elevation of an automobile equipped with head-lights embodying my invention.

Fig. II is a plan view of one-half of the forward part of an automobile so equipped.

Fig. III is a vertical section on line III—III of Fig. II looking in the direction indicated by the arrows.

Fig. IV is a side elevation of a portion of the front of an automobile showing the application of a modified form of my invention.

Fig. V is a vertical section of Fig. IV taken through those portions which feature the invention.

Fig. VI is a top plan of the forward portion of an automobile showing a further modification.

Fig. VII is a section on line VII—VII of Fig. VI looking in a forward direction.

Fig. VIII is a partial front elevation of an automobile showing still another modification.

Fig. IX is a plan view of Fig. VIII.

Fig. X is a section on line X—X of Fig. IX.

Fig. XI is a broken detail in section.

According to Figs. I to III inclusive, which appear on the first sheet of the drawings, an automobile 1 carries right and left fenders 2 which extend over the front wheels respectively through which the light is to be projected. Inasmuch as each of the two headlights are identical, except for location, only one will be described and the singular number hereinafter employed.

The fender 2 slopes downwardly in front and is there provided with a round opening 3 in which a piece of glass is removably seated. It should be noticed that the edge of the opening and hence the rim of the glass support conforms to the sloping contour of the adjoining portions of the fender. The design of such fender is clearly evident in Figs. II and III and its object is to make the place from which light is to be emitted as inconspicuous as possible during the day time. Extending rearwardly from the opening 3, secured therearound in any suitable manner, is a tube 5 having its rear end closed and curved and supported from the fender by means of a bracket 7. I have discovered that the best results are obtained when the length of the tube 5 is restricted within the approximate limits of 18 to 36 inches. The curved rear end 6 carries a lamp socket for the support of an incandescent electric lamp 8 of which the resistance filament should preferably be such as to project the maximum number of light rays in the direction of the axis of its socket. Spaced apart within the tube 5 so as to collect and redistribute the rays of light in a more effective way are a pair of lenses 9 and 10. The supply of current to the lamp 8 may be controlled in the usual manner from the instrument board or some other place accessible to the driver of the car.

The modification to which Figs. IV and V pertain involves the additional use of a mirror reflector which enables the source of light to be carried under the cowl so as to be more readily accessible in case its replacement is necessitated. According to this form the fender 11 has forwardly an opening 12 closed by a glass 13 fitted therein and supports a rearwardly extending substantially horizontal tube 14 in right angular communication at its rear end with an upright tube 15. Depending upon the upper end of the latter is an electric lamp 16 the rays of which are caused to pass through a lens 17 by which they are focused upon a mirror 18 which is set at an angle of 45° and by it projected in a substantially horizontal direction through another lens 19 and out.

The modification illustrated in Figs. VI and VII discloses a manner of supplying both headlights from a single source. A portion of an automobile 20 has front fenders 21 and have their inwardly and downwardly extending surfaces provided with openings 22 in which glass pieces 23 are mounted. In closed communication with the rear of the glass pieces 23 are substantially horizontal tubes 24 terminating at the rear into the lower ends of a pair of upwardly converging tubes 25 which in turn have lighting communication with a reflecting compartment 26 carrying interiorly an electric lamp 27 positioned in common focus with each of a pair of lenses 28 which are situated at the upper ends of the tubes 25. At the junction of the tubes 24 and 25 reflectors 29 are again provided at such an angle as to project the light there collected forwardly through a pair of lenses 30.

The modification depicted by Figs. VIII, IX and X involves the use of a tube which is brightly polished on its interior surface and particularly at the bent portion thereof. Adjacent the cowl 31 is a fender 32 fashioned forwardly with an opening 33 neatly covered with glass 34 in line with which a rearwardly extending tube 35 is supported. As it approaches the cowl 31 the tube 35 is curved both inwardly and upwardly at 36 and 37 to carry in its closed end an electric lamp 38 which may be assumed to be capable of manipulation and removable from the driving seat of the automobile. The lenses 39 and 40 are positioned across the tube 35 at opposite ends, whereby the light rays may again be directed in the most effective manner.

Fig. XI represents a modification of but one detail,—such being the provision of a separate parabolic reflecting surface 41 behind a lamp 42 secured at the closed end 43 of a curved tube 44 which is to be regarded as terminating so as to have lighting communication through the forward end of a fender.

I claim:

1. In combination, an automobile fender having one end curved both inwardly and rearwardly, glass fitted in a suitable opening in such end so as to conform thereto whereby to become foreshortened and less conspicuous, a tube having its one end closed by said glass, a light near the other end of said tube and a lens between said light and glass.

2. In combination, an automobile front fender having a forward end surface curved both downwardly and inwardly, said inwardly disposed portion also receding and provided with an opening, glass fitted in said opening so that its inward portion slopes in a rearward direction whereby such glass becomes correspondingly more nearly inconspicuous, and means for projecting light forwardly through said glass.

Signed by me, this 9" day of April, 1917.

FRANÇOIS RICHARD.